Sept. 22, 1959 H. S. KAWECKI 2,905,287
MOLDING CLIP AND SCREW
Filed July 20, 1954
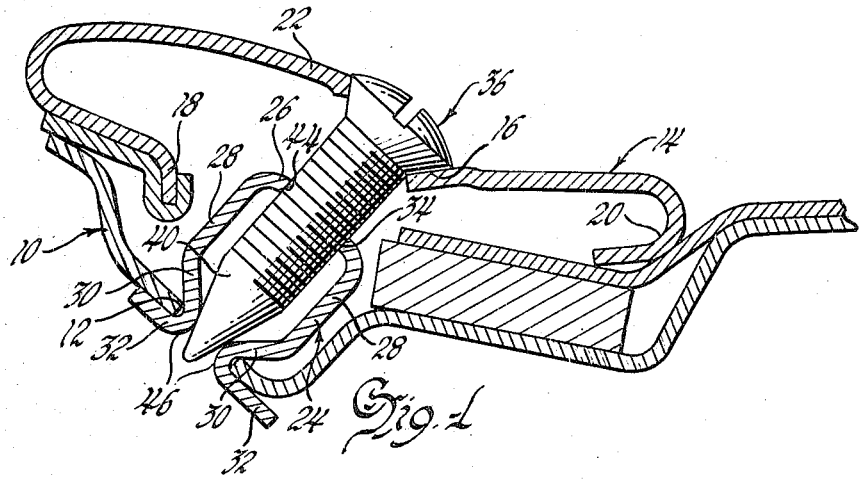
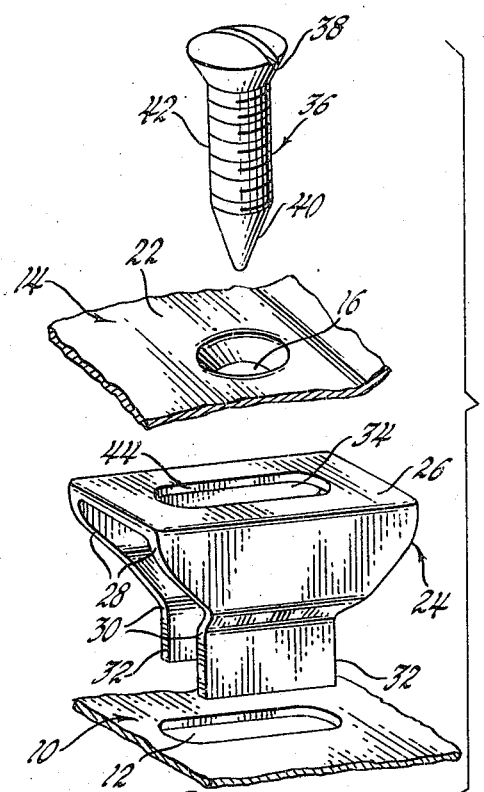
Inventor
Henry S. Kawecki
By L. D. Burch
Attorney United States Patent Office 2,905,287
Patented Sept. 22, 1959

2,905,287

MOLDING CLIP AND SCREW

Henry S. Kawecki, Ferndale, Mich., assignor to General Motors Corporation, Detroit, Mich., a corporation of Delaware Application July 20, 1954, Serial No. 444,458

3 Claims. (Cl. 189—88)

This invention relates to fastening devices, and more particularly to fastening devices for securing decorative objects such as elongated moldings having arched cross-sections to a support member.

It is frequently necessary, such as in assembly operations in the automobile industry, to secure decorative moldings and the like having various arched cross-sections to a support member. A great variety of devices for this purpose have been successfully employed. In such devices attention has often been particularly directed toward securely fastening the molding to the support member to prevent the subsequent loosening and rattling thereof which otherwise comes as a result of vibrations set up in the normal use of the automobile. Particular attention has also been directed toward attaining the very desirable features of simplicity of manufacture and application of such devices. In general the above objectives have been successfully achieved although improvements thereon are continuously developed. There are particular situations, however, where a decorative molding having an arched cross-section must be securely attached, but without excessive downward deflection of the molding toward the supporting member thereof since such excessive deflection seriously detracts from the appearance of the trim assembly. This control of the downward deflection of the molding in securing the same must not, however, entail time-consuming precautionary measures, but it must be in the nature of an automatic operation.

It is now proposed to provide a fastening device for objects of the type described having self-locking and self-spacing features so that the molding may be securely fastened and yet not excessively deformed. The proposed device includes a clip adapted to be secured to an apertured support between shoulders on the clip disposed on opposite sides of the support adjacent the aperture therein. The clip is provided with a head portion having an aperture therein for receiving a separate fastener element engaged with the molding. The separate fastener element is frictionally held in the aperture in the clip through engagement or deformation of the edges of the clip around the aperture by shoulders provided on the separate fastener. Furthermore, the separate fastener is provided with a tapered free end which may partly enter but not completely pass between the above shoulders and is of a predetermined length. Thus, the tapered free end spreads the portions of the clip between the shoulders engaging the support to provide the self-locking feature, but since the movement of the tapered free end through the support is limited it also serves to prevent the excessive downward deflection of the molding which constitutes a self-spacing feature. The apertures in the support member and the clip may be elongated to provide adjustment for mis-alignment between the various parts.

In the drawings:

Figure 1 is a cross-sectional view of a fastener assembly embodying the invention.

Figure 2 is a fragmentary exploded perspective view illustrating the important elements of the assembly shown by Figure 1.

Referring to the drawings in greater detail, a fastener assembly embodying the invention may comprise a supporting member, such as the automobile dash panel 10 shown by Figure 1, having a slot 12 and a decorative object to be secured to the supporting member 10, such as the molding 14, having a countersunk aperture 16. The molding 14 may be an elongated structure having an arched cross-section in which the sides 18 and 20 engage portions of the supporting structure 10 while the middle portion 22 is raised therefrom along the entire length of the molding.

In securing the molding 14 to the supporting structure member 10, the invention contemplates the use of a clip 24 having a relatively flat head portion 26 which is preferably substantially parallel to the surfaces of the molding 14 and the supporting member 10 and substantially normal to the axis of the aperture 16 and the slot 12. Extending downwardly from opposite sides of the head portion are a pair of leg portions 28 being turned inwardly to provide shoulders 30 and a pair of spaced integral downwardly extending tabs 32 which are spaced closer together than are the upper leg portions 28. As shown by Figure 1, the clip is placed so that the tab portions 32 extend through the slot 12 in the supporting member 10 and the tabs 32 are then deformed outwardly so that the clip 24 will be secured to the supporting member 10 by engagement thereof around the slot 12 between the shoulders 30 and the laterally extending tab portions 32. The molding 14 is then applied in position over the supporting member 10 so that the aperture 16 overlies some part of the slot 34 in the head 26 of the clip 24 and the slot 12 in the support member 10. It is now apparent that the slot 12 in the supporting member 10 and the slot 34 in the head 26 of the clip 24 provide longitudinal adjustment in the event that the position of the aperture 16 in the molding 14 varies within limits along the length thereof. A sheet metal type screw 36 having a tapered head 38 and a conical point 40 is inserted through the molding 14 and engaged with the clip 24 by rotating the screw 36 so that the threads 42 thereof may enter between and deform the edges 44 of the head at the slot 34.

It will be noted that the conical point 40 may enter between the bent portions 46 of the tabs 32 but that it may not pass completely through the same. Thus, if Figure 1 represents the original cross-sectional shape of the molding 14 as well as the desired final cross-sectional shape of the molding after the molding is secured by means of the screw 36, it is only necessary to determine the proper length of the screw 36 which will firmly wedge the conical point 40 thereof between the bent portions 46 of the clip 24 so that the clip may not be removed from the slot 12 in the support member 10 and at the same time the head 38 will firmly contact the molding 14 around the aperture 16 without obviously depressing the middle portions 22 of the molding toward the support member 10. Once having determined this proper length, a worker employed in securing the molding 14 need only tighten the screw 36 down firmly without being concerned with the amount the molding 14 is being depressed.

From the above specification and drawings it is apparent that there has been provided an easily manufactured and installed securing means which, in addition to being adjustable along the length of the parts being secured to correct for any misalignment between the parts, has self-locking and self-spacing features so that the securing of the parts may be done quickly and positively with assurance of neat work.

What is claimed is:

1. An assembly comprising a support member formed to provide a slot therein, an elongated molding positioned on said support and being formed to provide a fastener-receiving aperture therein aligned over said slot, said molding engaging said support along certain portions thereof and being spaced from said support along other portions thereof having said aperture therein, a clip having a head portion and deformable tabs thereon, said clip extending through said support slot and being secured to said support by deforming and clinching said tabs under said support, said clip being formed to provide an elongated slot in said head portion thereof disposed between and spaced from said support and said spaced portion of said molding, and a threaded fastener having a head received in said aperture in said molding and a shank having a threaded section thereon engaging opposite edges of said slot in said head portion of said clip, said shank having a smooth conical free end and being of such length that said conical end enters between and spreads said deformed tabs apart but so that said shank does not pass through said deformed tabs in the fully secured position of said threaded fastener, said threaded fastener locking said clip to said support without excessive deformation of said molding toward said support.

2. An assembly comprising a support member formed to provide a slot therein, an object secured to said support and being formed to provide an aperture therein aligned over said slot, said object engaging said support along the sides thereof and being raised from said support member along the portion thereof between said sides and having said aperture therein, a clip having a head portion and being secured by means of shoulders and deformable tabs thereon to said support, said clip having a slot in the head portion thereof disposed between said support and said raised portion of said object, and a fastener having a head received in said aperture in said molding and a threaded shank thereon engaging the edges of said slot in said clip, said shank having a tapered free end and being of such length that said tapered end only partially enters between and spreads apart but does not pass completely between said tabs, said threaded fastener shank locking said clip to said support member and said fastener tapered end preventing the excessive downward deformation of said object in securing the same to said support.

3. In combination in a molding strip assembly, a support member having an elongated slot formed therein, a clip received within said slot and having a flat head section with an elongated slot formed therein and a pair of legs extending from said head section in substantial parallel relation, said clip legs each being inwardly turned at an intermediate section to provide oppositely disposed shoulders and then outwardly bent to provide terminal tabs, said clip shoulders engaging said support member and said clip tabs extending through said support member slot and being outwardly deformed to secure said clip to said support, a molding strip section extending in the direction of said elongated slots and having flanged side portions engaging said support member and an arched middle portion raised therefrom and having an aperture therein, and a headed fastener received in said molding strip aperture and having a threaded section engaging opposite edges of said clip slot in threaded relation and a smooth conical tapered end section extending between said clip tabs and engaging said tabs at said shoulders and spreading said clip legs to wedge said clip into firm anchor engagement with said support member, said molding strip being anchored to said support member by said fastener and said clip with said molding strip middle portion maintaining its arched and spaced relation to said support member.

References Cited in the file of this patent

UNITED STATES PATENTS

| | | |
|---|---|---|
| 1,881,836 | Mitchell | Oct. 11, 1932 |
| 1,895,657 | Geiger | Jan. 31, 1933 |
| 2,208,779 | Tinnerman | July 23, 1940 |
| 2,671,254 | Meyer | Mar. 9, 1954 |
| 2,720,135 | Gisondi | Oct. 11, 1955 |